(12) United States Patent
Tarasewicz (10) Patent No.: US 7,152,936 B2
(45) Date of Patent: Dec. 26, 2006

(54) SECURE EQUIPMENT RACK DOOR ASSEMBLY

(75) Inventor: Matthew John Tarasewicz, Dousman, WI (US)

(73) Assignee: Matthew J. Tarasewicz, Dousman, WI (US)

( * ) Notice: Subject to any disclaimer, the term of this patent is extended or adjusted under 35 U.S.C. 154(b) by 311 days.

(21) Appl. No.: 10/799,791

(22) Filed: Mar. 13, 2004

(65) Prior Publication Data

US 2005/0200247 A1 Sep. 15, 2005

(51) Int. Cl.
*A47B 81/00* (2006.01)

(52) U.S. Cl. .................... 312/223.1; 312/329

(58) Field of Classification Search ............ 312/223.1, 312/223.6, 324, 329, 326, 265.1, 265.2, 265.3, 312/265.4, 265.5, 265.6; 16/257, 258, 380; 292/DIG. 17; 174/50; 211/26
See application file for complete search history.

(56) References Cited

U.S. PATENT DOCUMENTS

| 1,425,995 | A | * | 8/1922 | McGiveney ................. 16/229 |
| 3,969,788 | A | * | 7/1976 | McCullough ................ 16/326 |
| 5,711,053 | A | * | 1/1998 | Hafner ........................ 16/380 |
| 5,905,244 | A | * | 5/1999 | Smith et al. ................. 218/155 |
| 6,006,925 | A | * | 12/1999 | Sevier .......................... 211/26 |
| 6,213,577 | B1 | * | 4/2001 | Rooyakkers et al. ...... 312/265.3 |
| 6,238,027 | B1 | * | 5/2001 | Kohler et al. ............. 312/265.1 |
| 6,489,565 | B1 | * | 12/2002 | Krietzman et al. ......... 174/101 |
| 6,561,604 | B1 | * | 5/2003 | Leccia et al. ............... 312/326 |
| 6,594,857 | B1 | * | 7/2003 | Nhep et al. ................... 16/232 |
| 6,766,093 | B1 | * | 7/2004 | McGrath et al. ............ 385/134 |
| 6,981,750 | B1 | * | 1/2006 | Krampotich ............. 312/223.1 |
| 2006/0054336 | A1 | * | 3/2006 | McNutt et al. ............... 174/50 |

* cited by examiner

Primary Examiner—Janet M. Wilkens (57) ABSTRACT

A secure equipment rack door assembly is disclosed including a door, a secure fastening mechanism, and two identical brackets mountable to an existing telecommunications equipment rack. The mounting brackets are vertically fastenable to a telecommunications equipment rack using the existing rack dress screws and mounting holes distributed along the side rails of the telecommunications equipment rack. The mounting brackets further include a plurality of cable management fingers and hinge apertures. The hinge apertures of the mounting brackets are designed to accept a plurality of hinge posts located along a first side of the door, thusly allowing the door to be pivotably moveable relative to the mounting bracket. The hinge apertures further include a vertical slot which may accept the deadbolt portion of the secure fastening mechanism which may be located along a second side of the door.

18 Claims, 15 Drawing Sheets

SECURE EQUIPMENT RACK DOOR ASSEMBLY

BACKGROUND OF THE INVENTION

In the telecommunications industry, network equipment racks are widely used to hold and manage computer networking equipment, cabling, and related interconnects. Network equipment racks typically comprise a frame wherein a plurality of electronic components or connector locations including, but not limited to, copper cabling, fiber optics, network switching gear, and network servers, may be mounted.

Traditionally, ease of use and accessibility has been a priority regarding the cabling and equipment housed within network equipment racks. Network equipment racks are often located in accessible areas, such as basements, closets, and mechanical rooms. This has left both the equipment and related cabling prone to damage, vandalism, and access by unauthorized personnel. As the cost of computer networking equipment rises, and as businesses are realizing how proper management and securement of the interconnects between the equipment and the associated cabling directly relates to reduced downtime during outages, as well as increased network reliability, the idea of having this equipment and wiring in such vulnerable locations is becoming a growing concern of network administrators.

It is obvious that in today's world where businesses are extremely dependent upon their network, and in some cases cannot function without it, every possibility to reduce network downtime and increase the reliability their network must be seriously considered. With respect to this need of increased security and manageability, businesses are faced with the difficult decision between the extremely costly move of their existing network infrastructure to a more secure environment, or accepting a lower level of security and manageability by doing nothing at all.

It is obvious that there is a need within the industry for a system of securing a network equipment rack that may be implemented without the need to remove or reinstall any or all of the network equipment, wiring, or interconnects to a more secure location, while at the same time giving businesses the option of leaving some aspects of the network infrastructure accessible.

BRIEF SUMMARY OF THE INVENTION

One aspect of the present invention relates to at least, but is not limited to, one door which may be comprised of, but is not limited to, a solid metal structure with ventilation holes or durable plastic or a combination of both. The door generally comprises a first and second side, whereby the first side includes a plurality of hinge posts, and the second side may or may not include at least, but is not limited to, one secure fastening mechanism. The door is easily mountable and removable from the system in an open position by selectively inserting or removing the above mentioned hinge posts into or out of the slotted hinge apertures of the mounting brackets of the present invention.

The above mentioned at least one secure fastening mechanism mounted to the above mentioned at least one door is capable of slideably engaging/disengaging the slot of the chosen hinge aperture of the corresponding mounting bracket. The secure fastening mechanism may include an eyehole which is designed to align with an eyehole on the door while selectively engaged with the slotted hinge aperture of the corresponding mounting bracket, and may be further secured by installing a locking mechanism through the eyeholes of both the secure fastening mechanism and the door, in accordance with the present invention.

A further aspect of the present invention relates to a pair of identical mounting brackets, vertically mountable to a network equipment rack using existing rack dress screws. The mounting brackets comprise an L shape, and further include a plurality of cable management fingers, whereby the valleys of the cable management fingers define a transverse cable pathway in and out of the secure cavity defined by the door and the two mounting brackets, and the tips of the cable management fingers include a slotted hinge aperture capable of accepting the hinge post of the above mentioned door as well as accepting the deadbolt of the above mentioned secure fastening mechanism.

These and other features and advantages which characterize the present invention will be apparent to those skilled in the art upon review of the following detailed description and drawings of the preferred embodiment.

BRIEF DESCRIPTION OF THE SEVERAL VIEWS OF THE DRAWING

Referring to the drawings in which like reference numbers represent corresponding parts throughout. The various features of the drawings may not be to scale.

DETAILED DESCRIPTION OF THE INVENTION

Access to a secure equipment rack door assembly may be controlled by the type of locking mechanism used to secure the eyeholes of both the door and the secure fastening mechanism. A locking mechanism may comprise, but is not limited to, a combination lock, a padlock, or some similar device, thereby restricting access to only those individuals who have a special key or know the correct combination.

Figure 1:
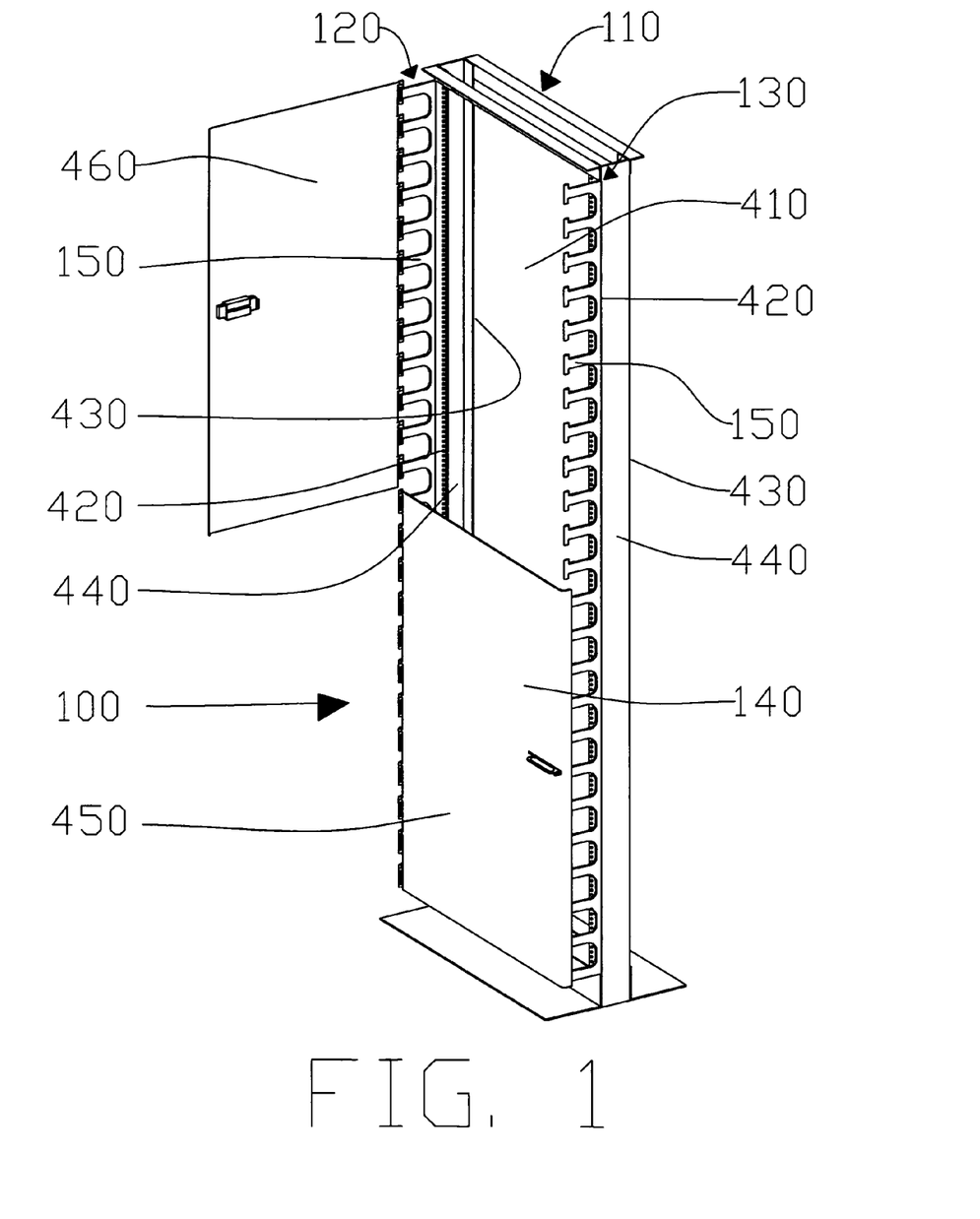
FIG. 1 is a front perspective view of one embodiment of a secure door assembly mounted to a standard network equipment rack in accordance with the present invention, including two doors with one door swung open and one door in a closed position, the secure fastening mechanism of the open door being in a disengaged position and the secure fastening mechanism of the closed door being in an engaged position.

FIG. 1 depicts a preferred embodiment of the present invention, wherein a secure equipment rack door assembly 100 is attached to a standard network equipment rack 110 in accordance with the present invention. The two identical vertical rails 440 of a standard network equipment rack 110 each generally comprise an identical front face 420 and rear face 430. The secure equipment rack door assembly 100 is designed to attach to either the front face 420 or rear face 430 of a standard network equipment rack 110. The secure equipment rack door assembly 100 defines a cavity 410 defined by one of the two faces 420, 430 of a standard network equipment rack 110 and the rear face 310 of a closed door 140 of the present invention, and is further defined by the first and second mounting brackets 120, 130 of the present invention, thus securing the vulnerable wiring, connector locations, or network gear (not shown) located along the chosen face 420, 430 of a standard network equipment rack 110.

Figure 2:
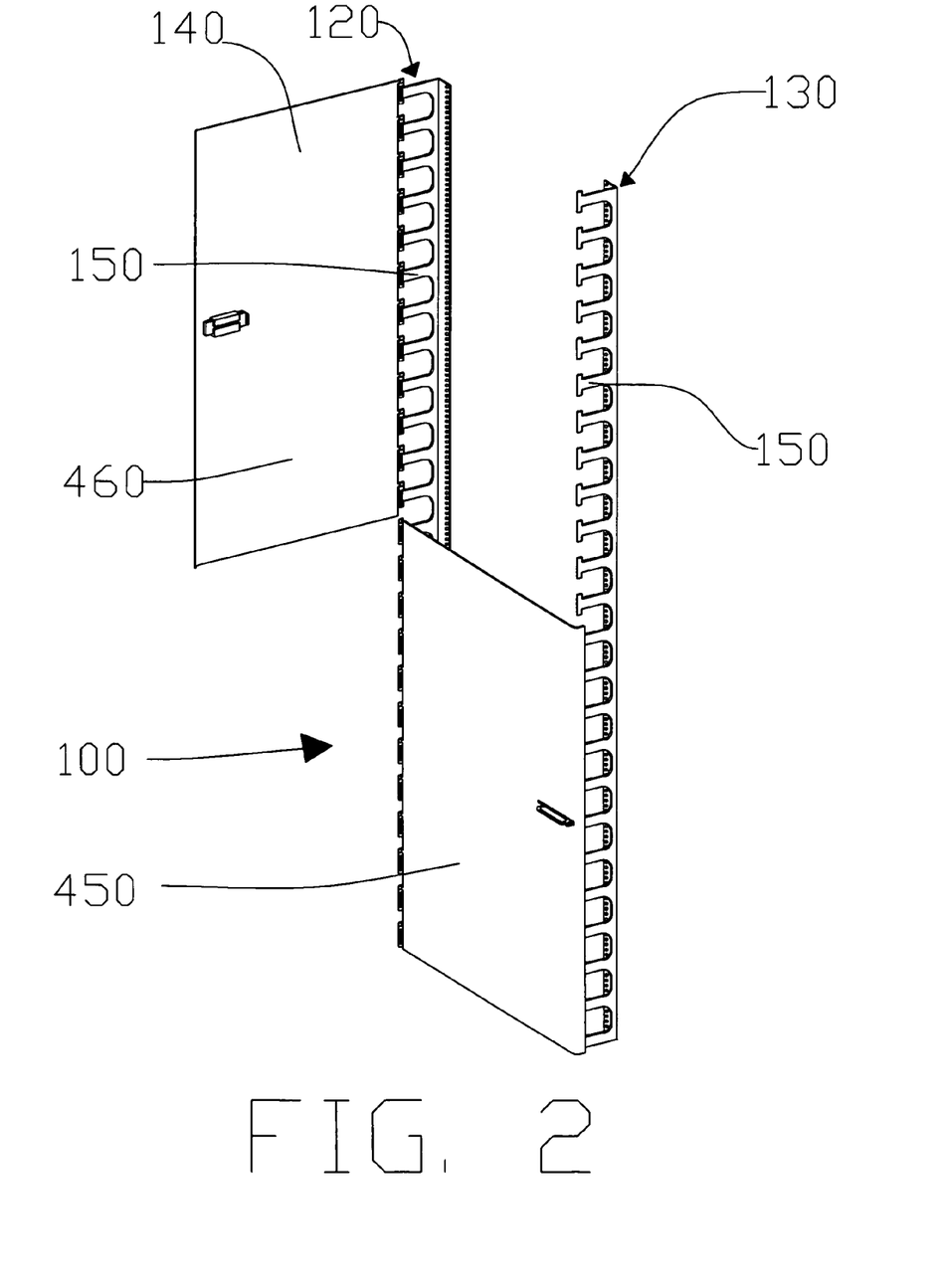
FIG. 2 is a front perspective view of one embodiment of a secure equipment rack door assembly, including two doors with one door swung open and one door in a closed position, the secure fastening mechanism of the open door being in a disengaged position and the secure fastening mechanism of the closed door being in an engaged position.

Referring now to FIG. 2, a preferred embodiment of a secure equipment rack door assembly 100 is depicted featuring a first mounting bracket 120, and second identical mounting bracket 130. FIG. 2 further depicts one door 460 swung open, exposing the rear face 310 of said door 460, and one door 450 closed, exposing the front face 300 of said door 450. Both the open door 460 and the closed door 450 are identical in construction, and will herewith be referred to as a door 140 of the present invention.

It is appreciated that a secure equipment rack door assembly 100 includes at least, but is not limited to, one door 140.

It is further appreciated that the doors 140 of the secure equipment rack door assembly 100 may vary in height, thus affording the administrator of the secure equipment rack door assembly 100 the ability to individually secure the different chosen aspects of a standard equipment rack 110.

Figure 3:
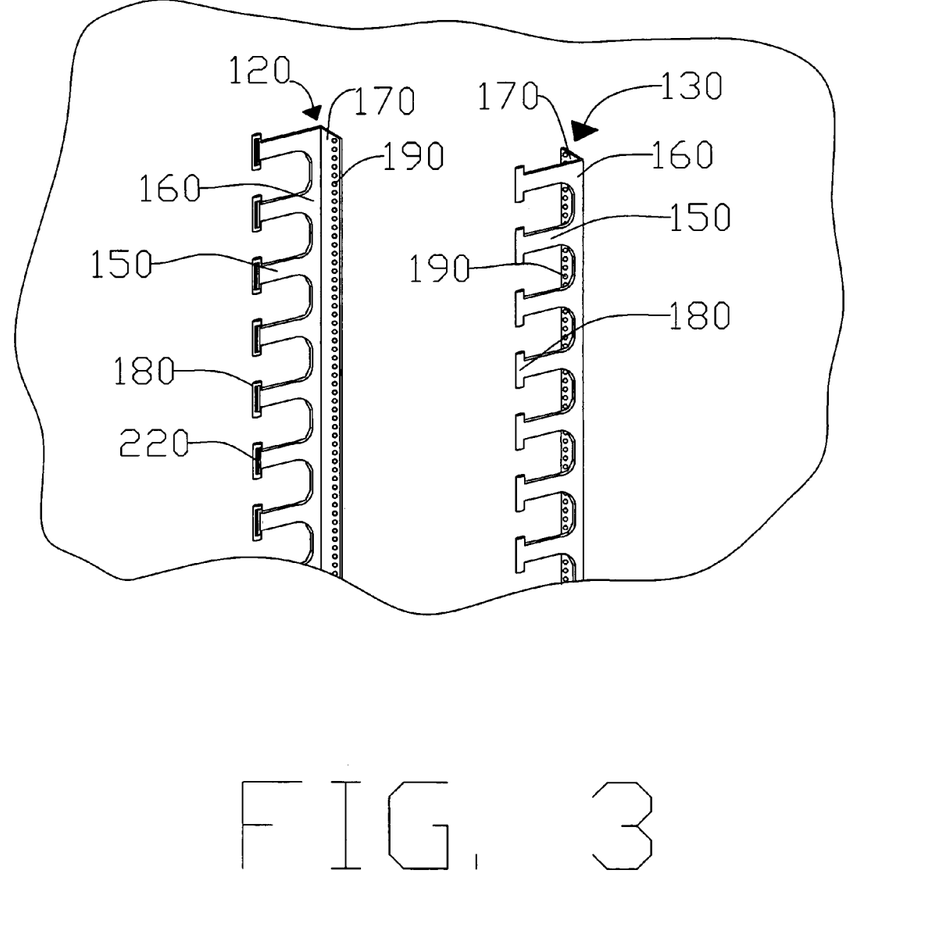
FIG. 3 is an enlarged front perspective view of the mounting bracket assembly of FIG. 2, in accordance with the present invention.
Figure 4:
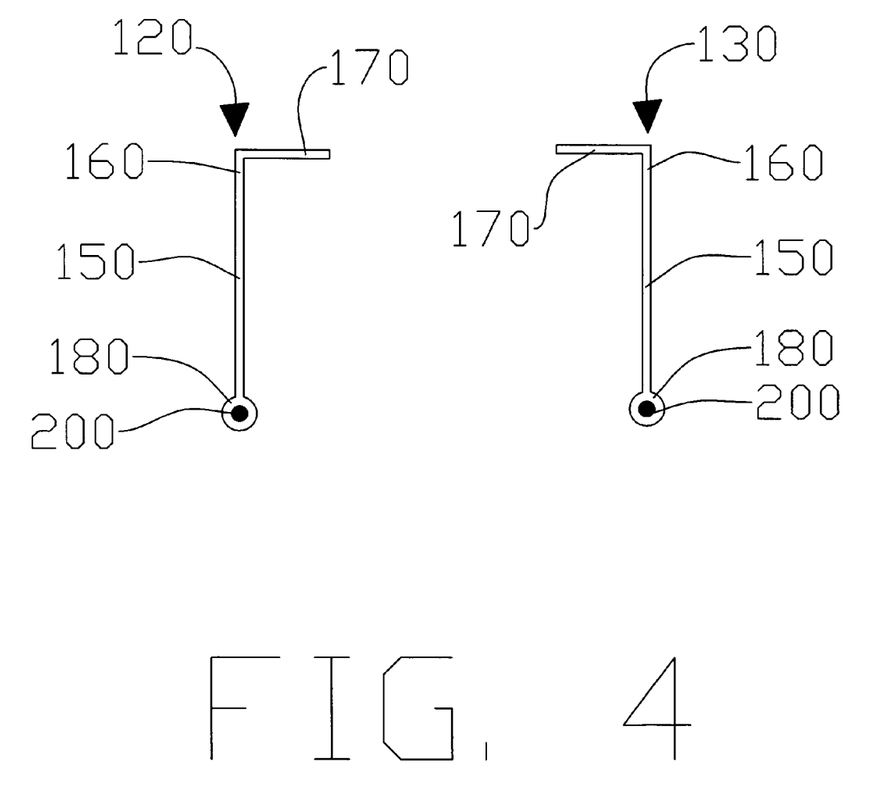
FIG. 4 is an enlarged top view of the mounting bracket assembly of FIG. 2, in accordance with the present invention.

Referring now to FIGS. 3 and 4, the L shaped mounting brackets 120, 130 of the secure equipment rack door assembly 100, being identical in construction and thusly interchangeable, generally comprise a rear plate portion 170 and a side plate portion 160. The side plate portion 160 of each mounting bracket 120, 130 include a plurality of identical cable management fingers 150. Located at the end of each cable management finger 150 is a slotted hinge aperture 180. The slotted hinge apertures 180 are all identical in size and shape.

Figure 5:
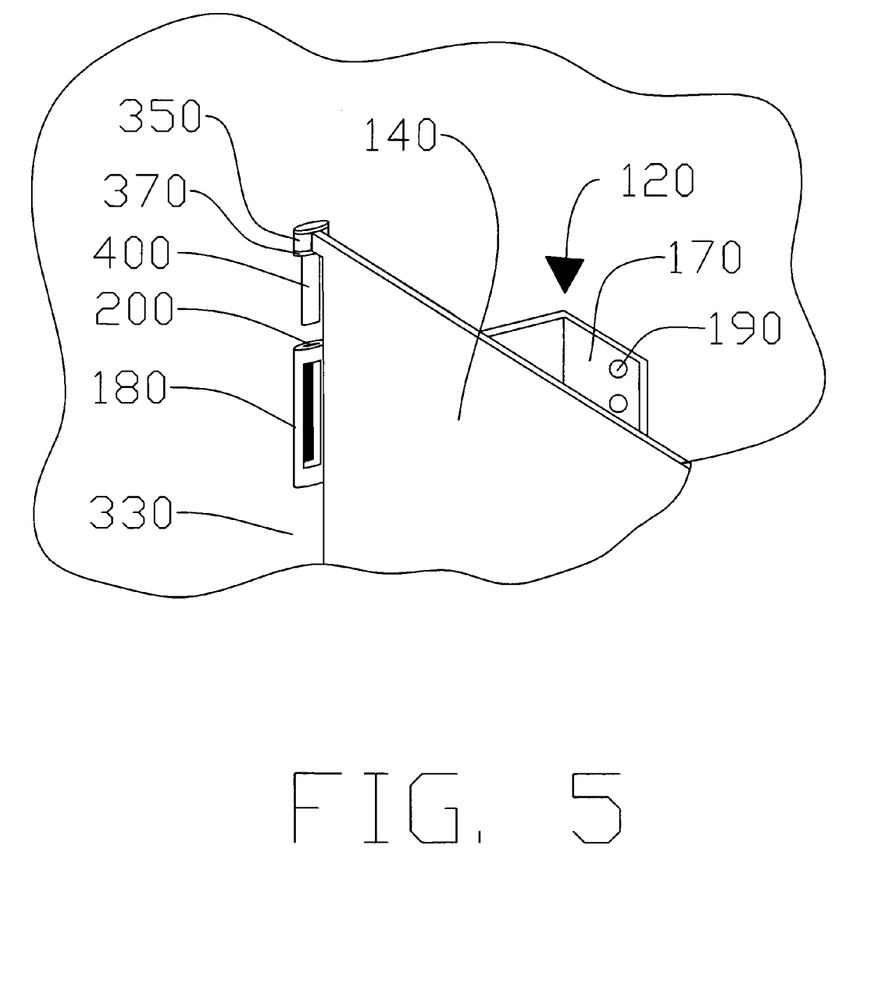
FIG. 5 is an enlarged front perspective view of one of the doors of FIG. 2, with one of the hinge posts exploded from the slotted hinge aperture of a mounting bracket, in accordance with the present invention.

Referring now to FIG. 5, the slotted hinge apertures 180 define a cavity 200 slightly larger than the second section 400 of the hinge posts 210 located along the first side 330 of a secure equipment rack door 140, yet slightly smaller than the ring 370 of the above mentioned hinge post 210.

Figure 15:
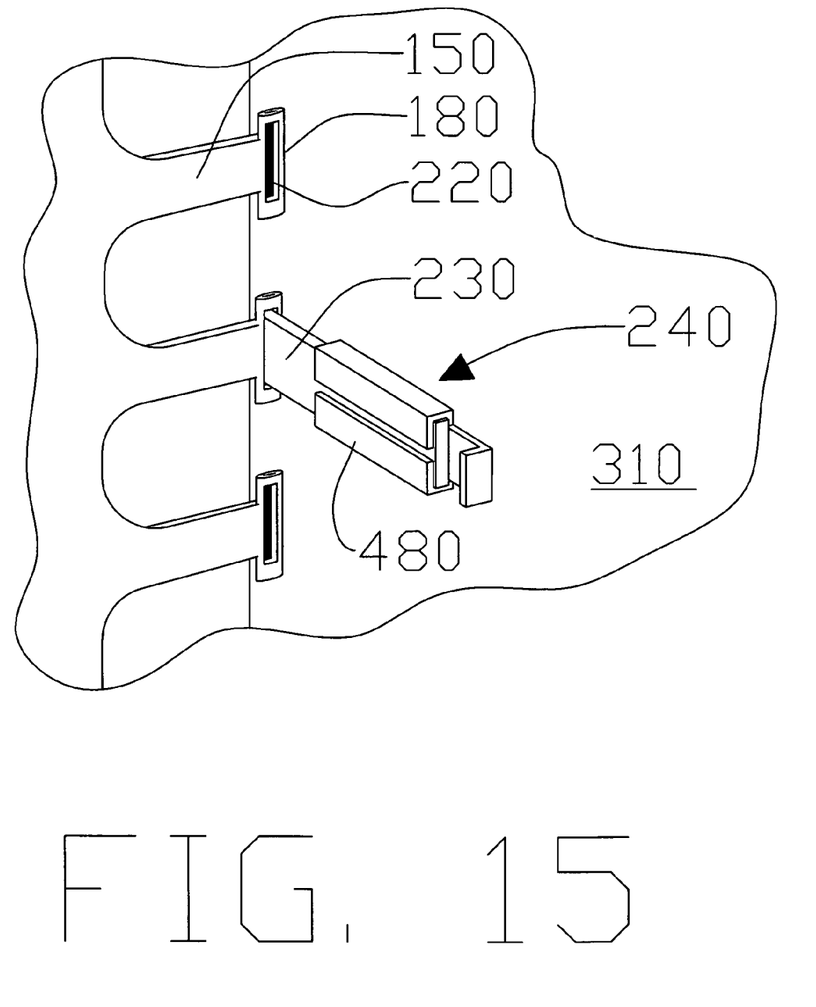
FIG. 15 is an enlarged rear perspective view of the door of FIG. 2, with the deadbolt of the secure fastening mechanism engaged with a slotted hinge aperture of a mounting bracket, in accordance with the present invention.

Referring now to FIG. 15, the slotted hinge apertures 180 located at the ends of the cable management fingers 150 further include a vertical slot 220 sized to be slightly larger than the deadbolt 230 of the secure fastening mechanism 240, thereby allowing the above mentioned deadbolt 230 to engage the slotted hinge aperture 180 designed to accept it, effectively securing the equipment rack door 140.

Referring again to FIG. 3, the mounting brackets 120, 130 further comprise a rear plate portion 170. The rear plate portion 170 of each mounting bracket 120, 130 includes a plurality of mounting holes 190 arranged to correspond in both size and spacing to the mounting holes (not shown) located along each face 420, 430 of a standard equipment rack 110.

Figure 6:
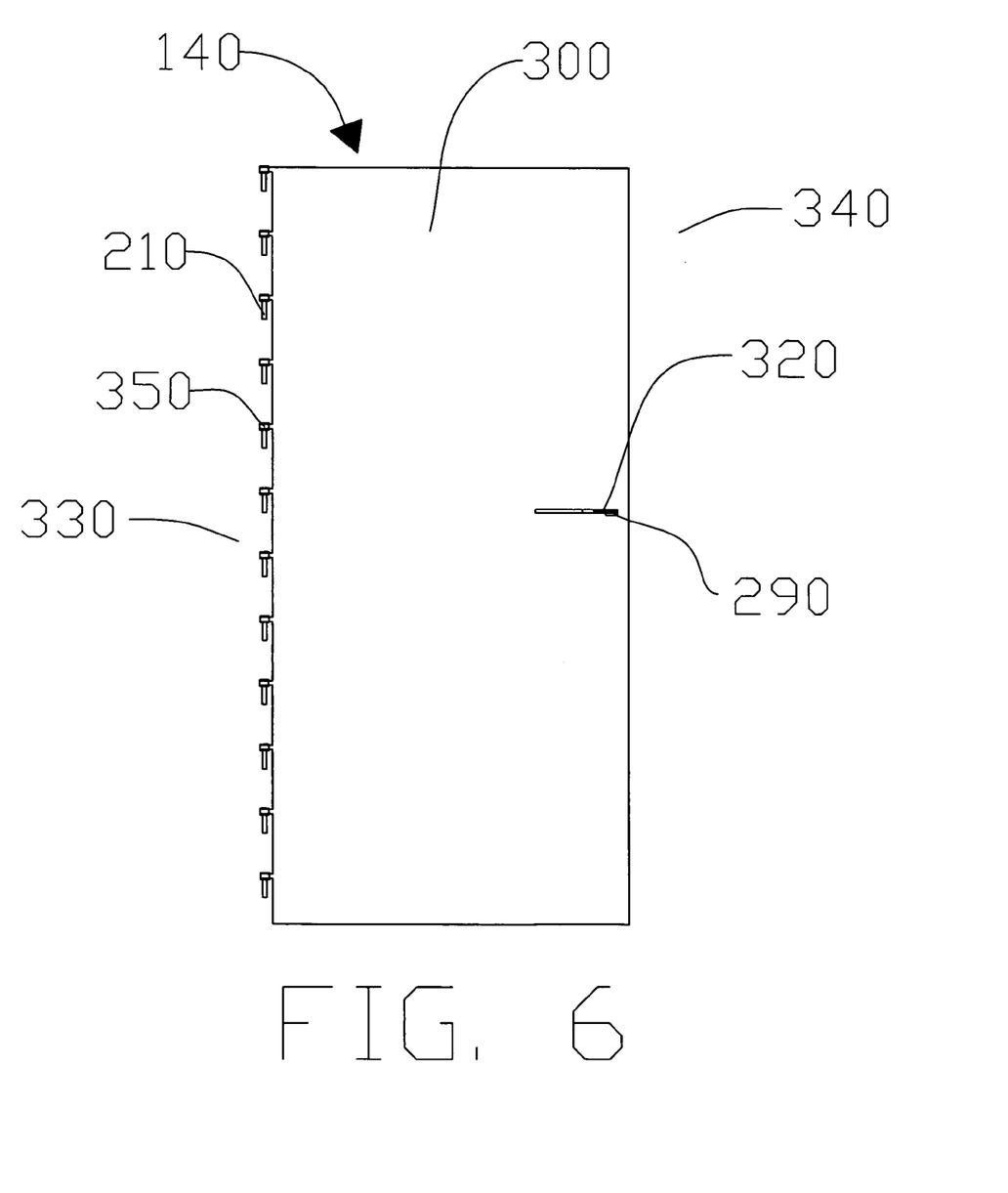
FIG. 6 is a front view of one of the doors of FIG. 2 with the secure fastening mechanism in a disengaged position, in accordance with the present invention.
Figure 7:
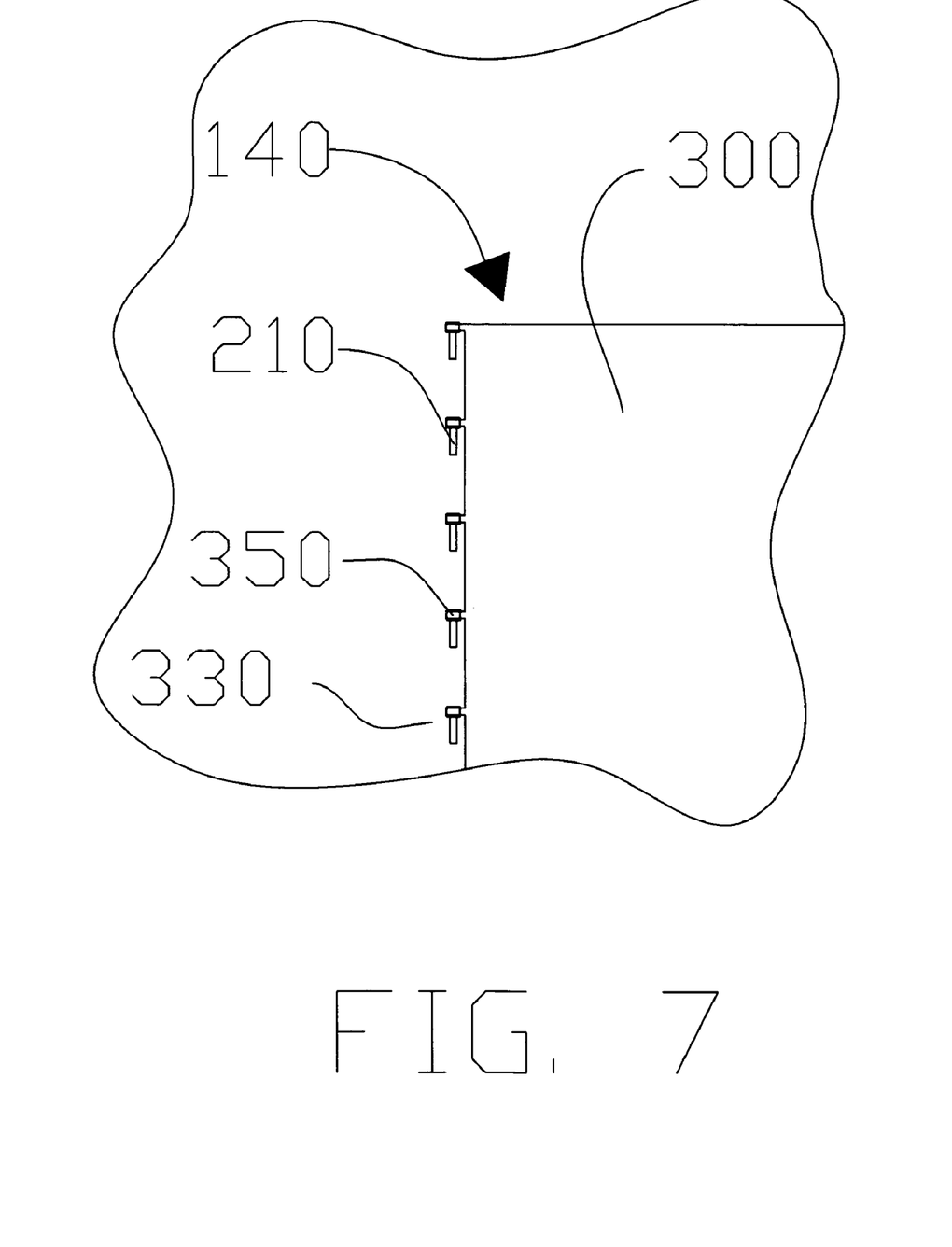
FIG. 7 is an enlarged front view of the door of FIG. 6, with the hinge posts being attached to the door using hinge tabs, in accordance with the present invention.
Figure 11:
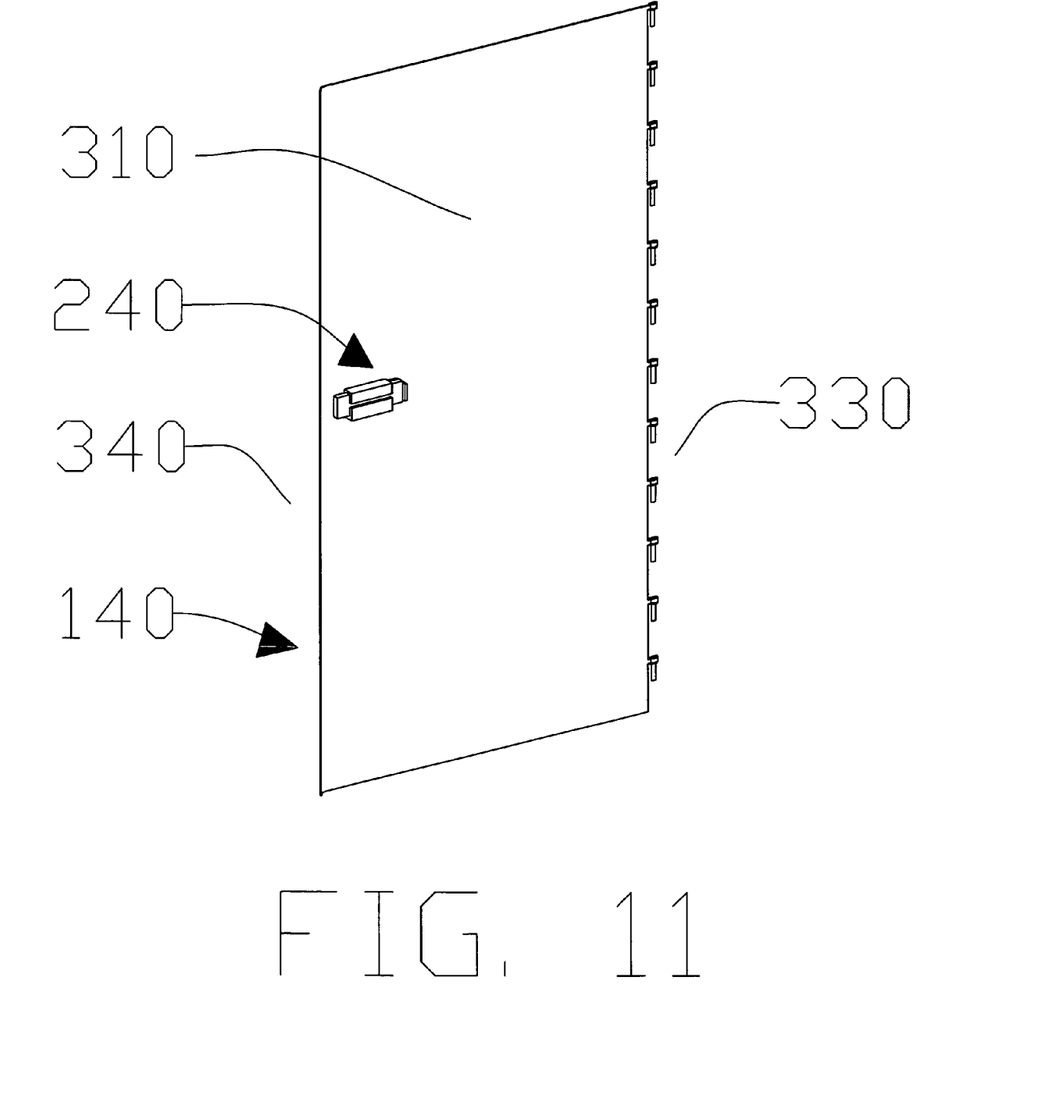
FIG. 11 is a rear perspective view of the door of FIG. 6, with the deadbolt of the secure fastening mechanism in a disengaged position, in accordance with the present invention.
Figure 12:
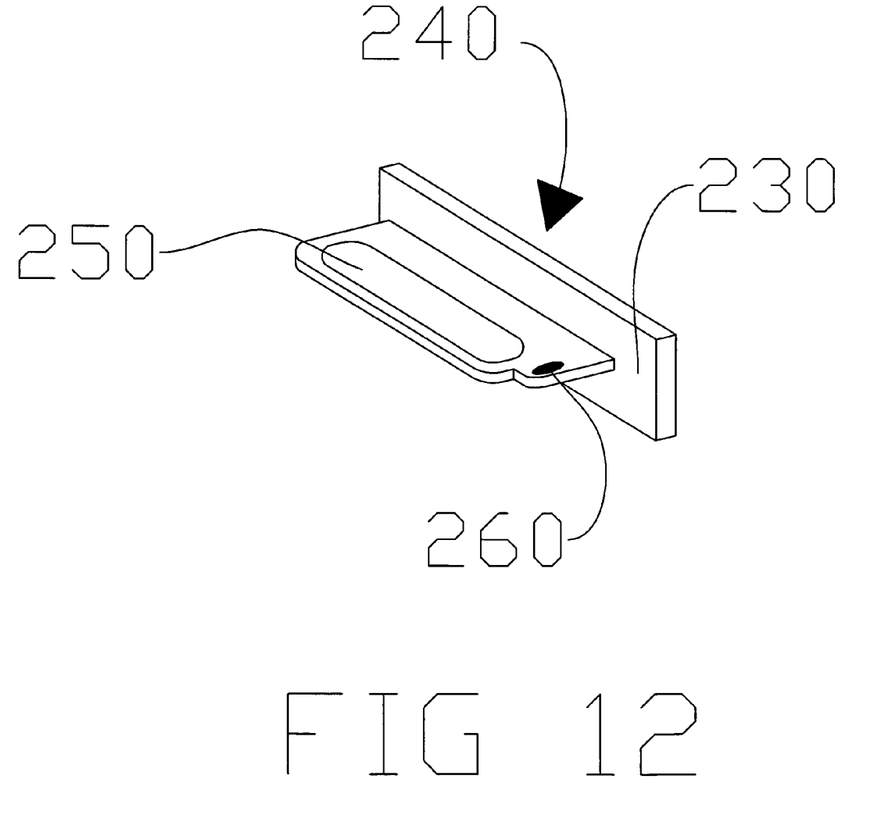
FIG. 12 is an enlarged perspective view of one embodiment of a secure fastening mechanism, in accordance with the present invention.
Figure 13:
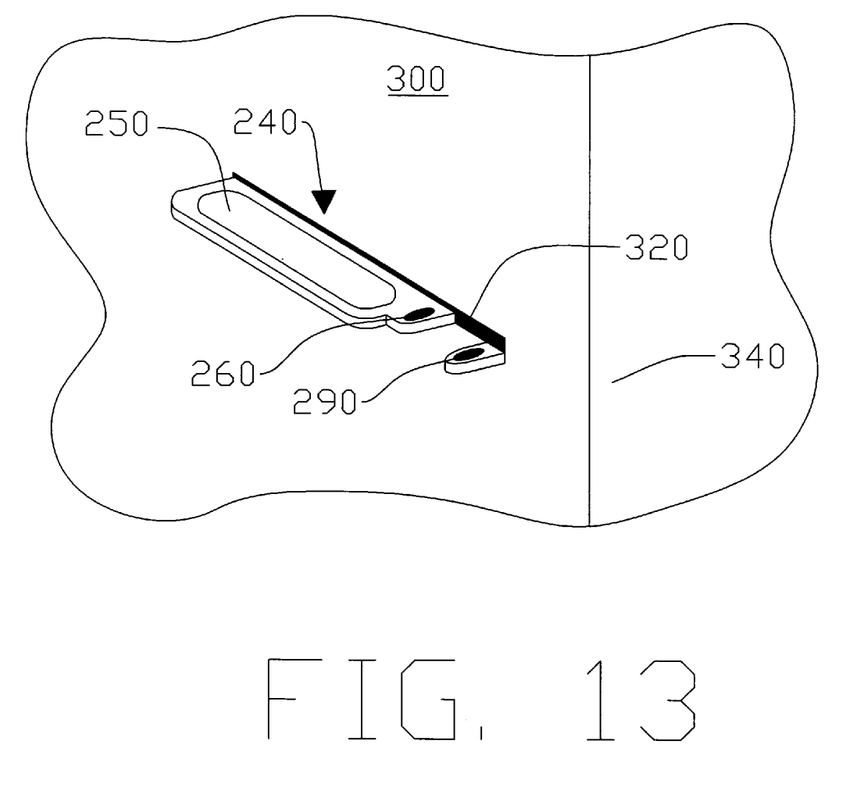
FIG. 13 is an enlarged perspective view of the door of FIG. 6, with the secure fastening mechanism in a disengaged position, in accordance with the present invention.
Figure 14:
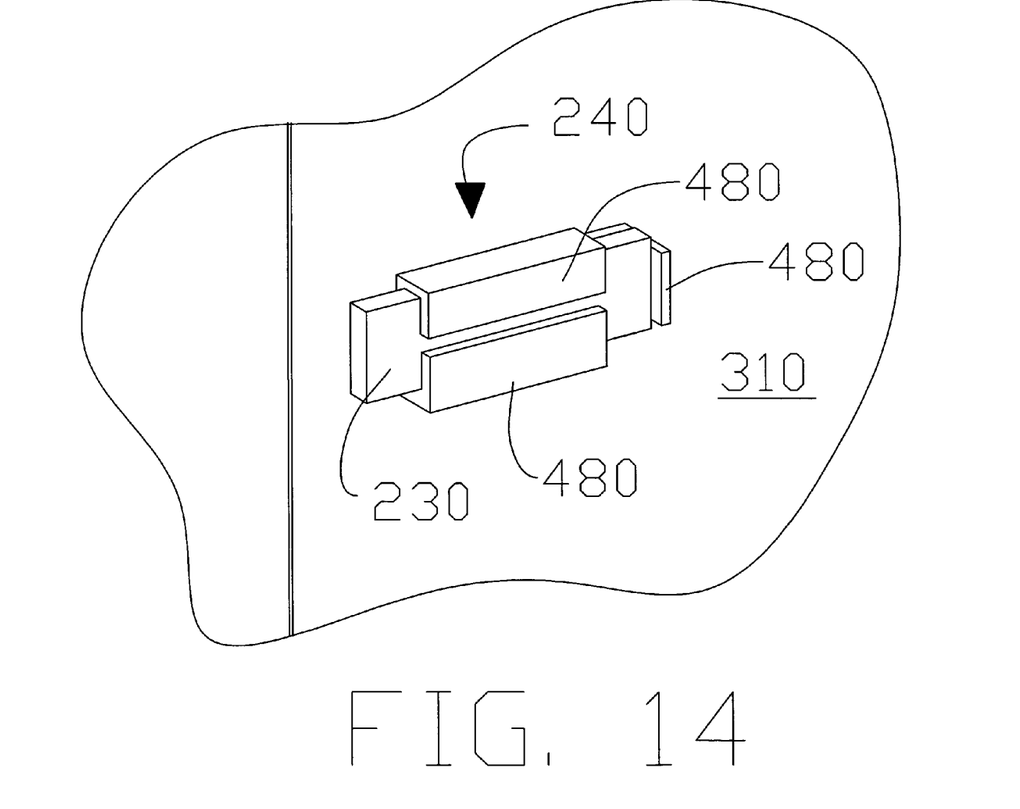
FIG. 14 is an enlarged perspective view of the door of FIG. 11, with the secure fastening mechanism in a disengaged position, in accordance with the present invention.

Referring now to FIGS. 6 and 11, a further aspect of the present invention is a door 140, which generally comprises a front face 300, a rear face 310, a first side 330, and a second side 340.

Referring now to FIGS. 5 thru 9, the first side 330 of a secure equipment rack door 140 includes a plurality of hinge tabs 350. Each hinge tab 350 is identical and defines a cavity 360 wherein a hinge post 210 may be fastened.

Figure 8:
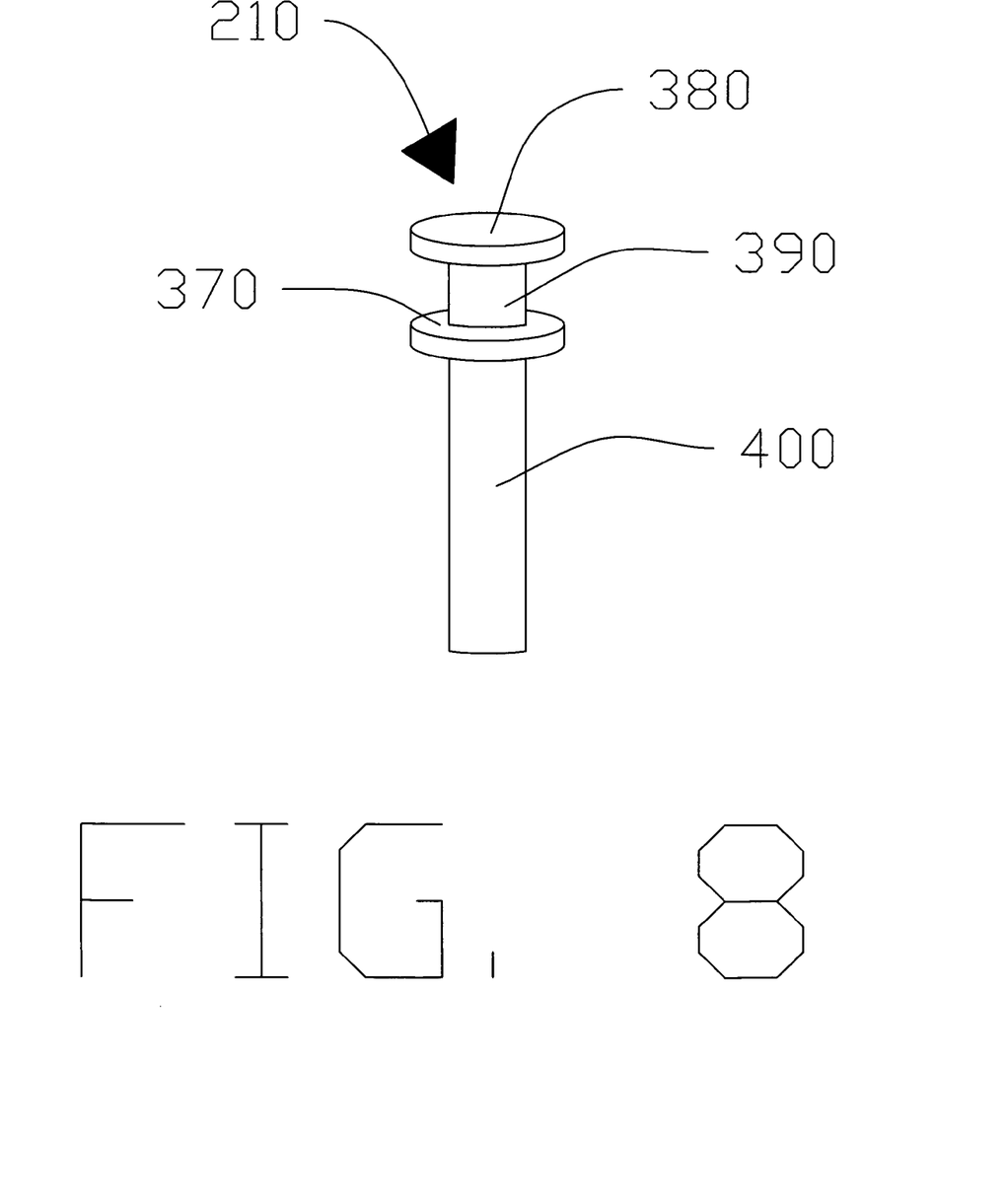
FIG. 8 is an enlarged perspective view of a hinge post of the present invention.

The hinge posts 210 generally comprise a cap 380, a ring 370, a first section 390, and a second section 400. The first section 390 of the hinge post 210 is sized to be slightly smaller than the cavity 360 of the tab 350, while the cap 380 and ring 370 of each hinge post 210 are sized to be slightly larger than the cavity 360 defined by each tab 350, thus restricting the vertical movement of the hinge post 210 within the tab 350.

Figure 9:
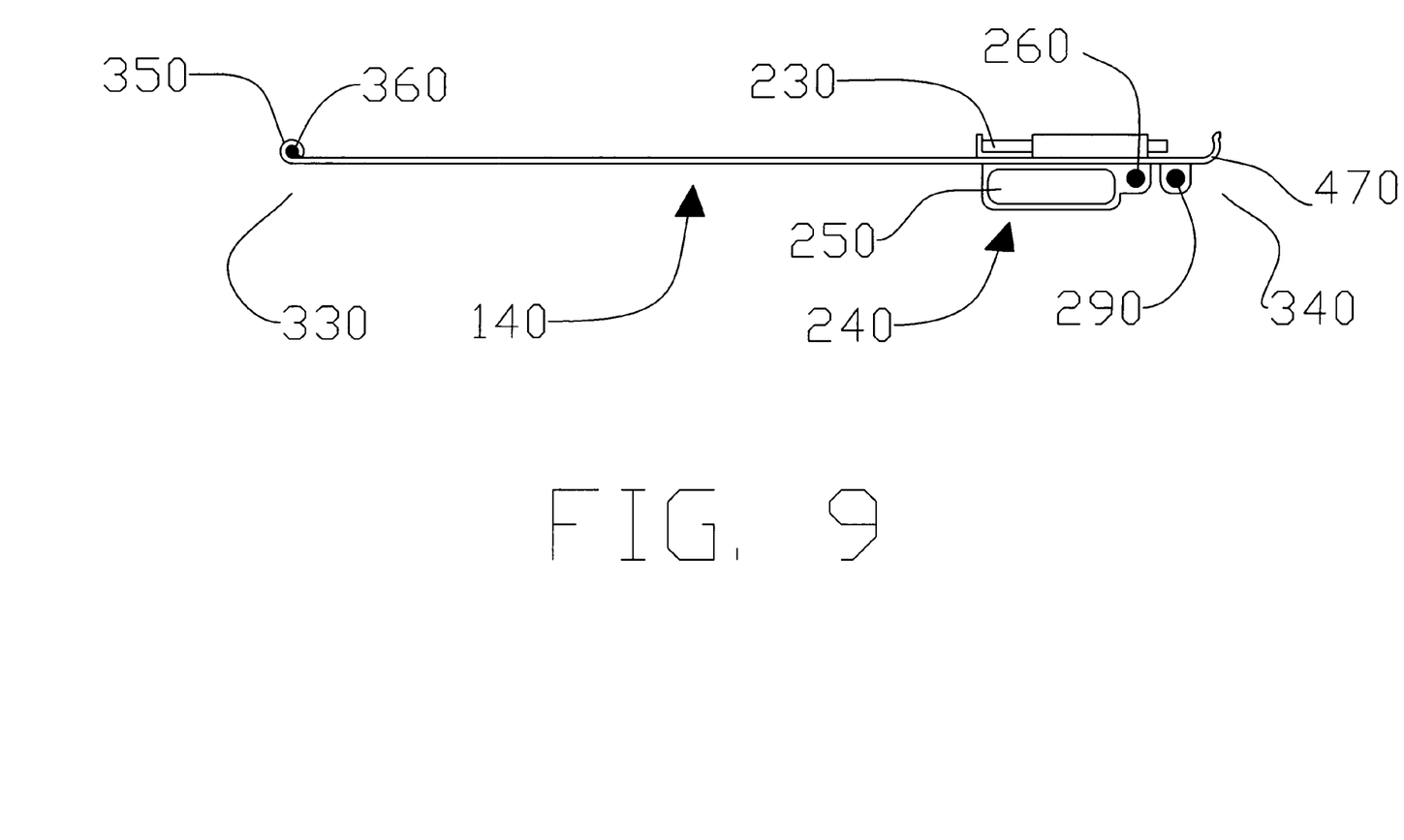
FIG. 9 is a top view of the door of FIG. 6, in accordance with the present invention.
Figure 10:
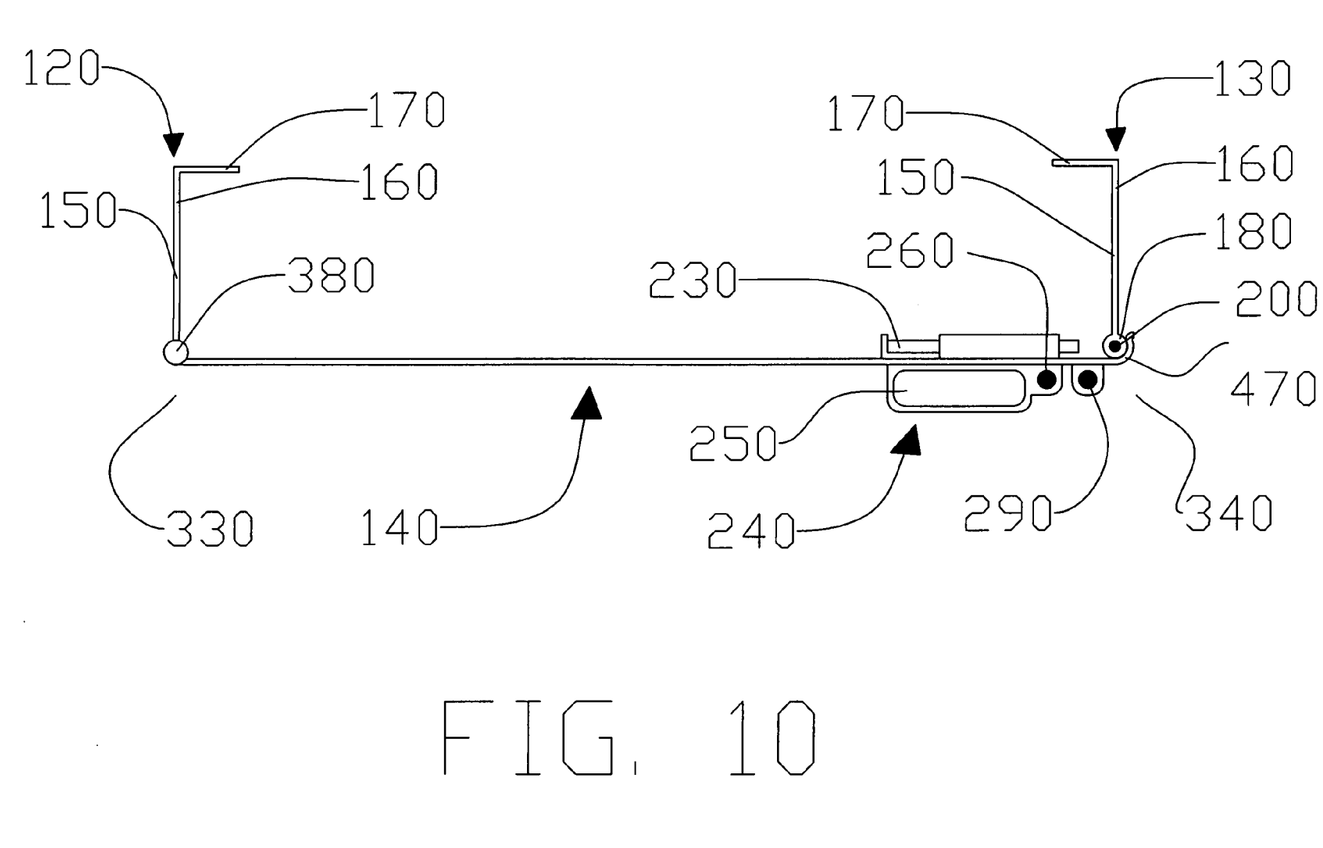
FIG. 10 is a top view of the secure equipment rack door assembly of FIG. 2 with both doors being closed, in accordance with the present invention.

Referring now to FIGS. 9 and 10, the second side 340 of the door 140 defines a lip 470, designed to curl around the slotted hinge apertures 180 of the second mounting bracket 130 aiding in the alignment of the dead bolt 230 of the secure fastening mechanism 240, also located along the second side 340 of the above mentioned door 140, with the slot 220 of the hinge aperture 180 designed to accept it, as well as providing a positive connection between the door 140 and the second mounting bracket 130 when the door 140 is in a closed position.

Referring now to FIGS. 12 thru 15, the secure fastening mechanism 240 generally comprises a handle portion 250 and a deadbolt portion 230. The handle portion 250 of the secure fastening mechanism 240 includes an eyehole 260 designed to align with the eyehole 290 of the door 140 when the secure fastening mechanism 240 is selectively engaged, wherein a locking mechanism including, but is not limited to, a padlock or combination lock (not shown) may be incorporated to further secure the equipment rack door assembly 100 of the present invention. Referring again to FIGS. 14 and 15, the rear face 310 of the door 140 includes at least, but is not limited to, one guide rail 480 wherein the deadbolt 230 of the secure fastening mechanism 240 may align with the slot 220 of the chosen slotted hinge aperture 180 of the second mounting bracket 130.

Referring again to FIG. 13, the second side 340 of the door 140 further includes a slot 320 wherein the secure fastening mechanism 240 may attach, thus allowing the secure fastening mechanism 240 to slideably engage or disengage the chosen slotted hinge aperture 180 of the second mounting bracket 130, thereby aligning the eyehole 260 of the handle 250 of the secure fastening mechanism 240 with the eyehole 290 of the door 140.

Having described the present invention in a preferred embodiment, modifications and equivalents may occur to one skilled in the art. It is intended that such modifications and equivalents shall be included within the scope of the claims which are appended hereto.

What I claim as my invention is:

1. A secure door assembly for an equipment rack, comprising:
   a) a first and a second mounting bracket fastenable to said equipment rack, each said mounting bracket comprising a rear plate portion and a side plate portion, said rear plate portion being located at a first end of said side plate portion;
   b) a plurality of hinge apertures formed along at least a portion of each side plate portion of each mounting bracket, at least one of said hinge apertures including a slot formed therein; and
   c) a door hingeably fastenable to said hinge apertures of said mounting bracket opposite said hinge aperture having said slot, the door pivotally moveable relative to said mounting bracket and constructed to engage said slot when said door is closed.

2. The secure door assembly of claim 1, wherein said mounting brackets include an L shape.

3. The secure door assembly of claim 1, wherein said side plate portion includes a plurality of cable management fingers.

4. The secure door assembly of claim 3, wherein each of said plurality of cable management fingers defines an opening between adjacent cable management fingers and extends from said aperture to said first end of said side plate portion.

5. The secure door assembly of claim 1, wherein said door includes a plurality of hinge posts along a first side.

6. The secure door assembly of claim 5, wherein said hinge apertures are sized and spaced to accommodate said hinge posts of said door.

7. The secure door assembly of claim 1, wherein said rear plate portion comprises a plurality of mounting points sized and spaced to accommodate mounting holes of said equipment rack.

8. The secure door assembly of claim 1 wherein each of said hinge apertures includes a slot formed therein.

9. A method of mounting a secure door to an equipment rack, the method comprising the steps of:
   a) securing a first mounting bracket to said equipment rack, said first mounting bracket comprising a side plate portion, a rear plate portion at a first end of said side plate portion, a plurality of cable management fingers located at a second end of said side plate portion, said cable management fingers including a hinge aperture, and a plurality of mounting points located along said rear plate portion;
   b) securing a second mounting bracket to said equipment rack, said second mounting bracket comprising a side plate portion, a rear plate portion at a first end of said side plate portion, a plurality of cable management fingers located at a second end of said side plate portion, said cable management fingers including a hinge aperture, and a plurality of mounting points located along said rear plate portion; and
   c) inserting a plurality of hinge posts located along a first side of said door into said hinge apertures of said first mounting bracket, wherein said door is sized to span from said first mounting bracket to said second mounting bracket.

10. The method of claim 9, wherein said first and said second mounting brackets are secured to said equipment rack utilizing a plurality of dress screw holes located on said equipment rack.

11. The method of claim 10, wherein said first and said second mounting brackets are attached to said equipment rack in opposition to each other.

12. The method of claim 11, further comprising the step of attaching said door to said first mounting bracket.

13. A method of attaching a door to an equipment rack, the method comprising the steps of:
   a) securing a first mounting bracket to an equipment rack;
   b) securing a second mounting bracket to said equipment rack, each of said first and second mounting brackets comprising:
      a side plate portion;
      a rear plate portion located at a first end of said side plate portion and having a plurality of mounting points;
      a plurality of cable management fingers;
      a plurality of slotted hinge apertures located at a second end of said side plate portion; and
   c) engaging a plurality of hinge posts located along a first side of a door into said slotted hinge apertures of said first mounting bracket, wherein said door is sized to span from said first mounting bracket to said second mounting bracket.

14. The method of claim 13 further comprising attaching a secure fastening mechanism to a second side of said door generally opposite said first side and constructing said secure fastening mechanism to removably engage a slot of said plurality of slotted hinge apertures.

15. The method of claim 14 further comprising attaching an eyehole to said secure fastening mechanism and another eyehole to said door such that said eyehole and said another eyehole are generally aligned when said secure fastening mechanism is engaged with said slot.

16. The method of claim 13 further comprising engaging another plurality of hinge posts located along a first side of another door into another plurality of slotted hinge apertures located along said second end of said side plate portion.

17. The method of claim 16 further comprising engaging said another door with one of said first mounting bracket and said second mounting bracket.

18. The method of claim 13 wherein slots of said slotted hinge apertures of said first mounting bracket face slots of said slotted hinge apertures of said second mounting bracket when said first and second mounting brackets are secured to said equipment rack.

* * * * *